United States Patent [19]

Hardison

[11] 4,238,462

[45] Dec. 9, 1980

[54] AUTOCIRCULATION PROCESS AND APPARATUS

[75] Inventor: Leslie C. Hardison, Barrington, Ill.

[73] Assignee: Air Resources, Inc., Palatine, Ill.

[21] Appl. No.: 873,941

[22] Filed: Jan. 31, 1978

[51] Int. Cl.$^3$ .................... B01D 53/36; B01J 10/00
[52] U.S. Cl. .................... 423/224; 423/210; 423/226; 423/659; 261/21; 261/23 R; 261/146; 261/148; 422/170; 422/193; 422/197; 423/573 G 422/197
[58] Field of Search .............. 423/220, 224, 573 G, 423/573 R, 226, 659, 210; 23/282, 284, 288 E; 261/21-23 R, 146-148, 123; 55/73; 422/170, 193, 197

[56] References Cited

U.S. PATENT DOCUMENTS

| | | | |
|---|---|---|---|
| 2,383,946 | 9/1945 | Tietig | 423/659 |
| 2,738,174 | 3/1956 | Magnant et al. | 23/285 X |
| 3,097,925 | 7/1963 | Pitts, Jr. et al. | 423/226 X |
| 3,405,920 | 10/1968 | Lefrancois | 261/123 |
| 3,426,095 | 2/1969 | Passley | 23/288 E |
| 3,721,530 | 3/1973 | Bouchet | 23/288 E |
| 3,957,442 | 5/1976 | Yamamoto et al. | 23/285 |
| 3,969,490 | 7/1976 | Beuckelaer et al. | 423/659 |
| 3,988,117 | 10/1976 | Schnur et al. | 23/285 |
| 4,099,925 | 7/1978 | Yanagioka et al. | 55/73 |
| 4,156,712 | 5/1979 | Kanai et al. | 423/220 X |

*Primary Examiner*—Earl C. Thomas
*Attorney, Agent, or Firm*—Merriam, Marshall & Bicknell

[57] ABSTRACT

A process for reacting a circulating liquid reaction solution with a gas in separate reaction zones within a single reaction vessel wherein the liquid reaction solution is continuously circulated between a first reaction zone and a second reaction zone within the reaction vessel but providing at least two side-by-side reaction chambers in open flow communication at their upper and lower ends with a gas supply means associated with each said chamber for introducing a gas in a finely divided form into the lower ends of each said chamber, and said gas supply means including flow control means whereby the rate of upwardly flow of gas in one of the chambers is greater than the rate of upwardly flow of gas in the other chamber so as to lower the density of the liquid reaction solution in the one chamber and provide continuous upwardly flow of liquid reaction solution and gas in the one chamber and downwardly flow of liquid reaction solution countercurrent to the flow of gas in the other chamber. The process and apparatus are particularly adapted for continuously carrying out two distinct chemical reactions between a liquid reaction solution and two different gases in a single reaction vessel, such as a catalytic oxidation-reduction process for removing hydrogen sulfide gas from a process gas stream.

7 Claims, 4 Drawing Figures

AUTOCIRCULATION PROCESS AND APPARATUS

This invention relates generally to reacting gases with a liquid in separate reaction zones within a single vessel and more particularly to an improved method and apparatus for continuously removing hydrogen sulfide gas from a fluid stream by reacting with a catalytic solution and continuously regenerating the catalytic solution by reacting with an oxygen containing gas.

In a catalytic process for removing hydrogen sulfide gas ($H_2S$) from a fluid stream using a ferric iron catalyst, such as a ferric iron chelate, the ferric iron is reduced to the ferrous state when reacted with hydrogen sulfide. The series of reactions involved in catalytically oxidizing hydrogen sulfide gas to form elemental sulfur using a ferric iron chelate catalytic reagent can be represented by the following equations:

$$H_2S(Gas) + H_2O(Liquid) \rightleftharpoons H_2S(Aqueous) + H_2O(Liquid) \quad (1)$$

$$H_2S(Aqueous) \rightleftharpoons H^+ + HS^- \quad (2)$$

$$HS^- \rightleftharpoons H^+ + S^= \quad (3)$$

$$S^= + 2(Fe.Chelate)^{+3} \rightarrow S°(Solid) + 2(Fe.Chelate)^{+2} \quad (4)$$

By combining equations (1) through (4) the resulting equation is:

$$H_2S(gas) + 2(Fe.Chelate)^{+3} \rightarrow 2H^+ + 2(Fe.Chelate)^{+2} + S° \quad (5)$$

In order to have an economical workable process to effect catalytic oxidation of the hydrogen sulfide, it is essential that the hydrogen sulfide gas be brought continuously into intimate contact with a large volume of the chelated iron solution and that the ferrous iron chelate formed in the above described manner be continuously regenerated by oxidizing to ferric iron chelate by intimately contacting the reaction solution with dissolved oxygen, preferably in the form of ambient air. The series of reactions which take place when regenerating the required ferric iron chelate can be represented by the following equations:

$$O_2(gas) + 2H_2O \rightleftharpoons O_2(aqueous) + 2H_2O \quad (6)$$

$$O_2(aqueous) + 2H_2O + 4(Fe.Chelate)^{+2} \rightleftharpoons 4(OH)^- + 4(Fe.Chelate)^{+3} \quad (7),$$

or $$\tfrac{1}{2}O_2 + H_2O + 2(Fe.Chelate)^{+2} \rightleftharpoons 2(OH^-) + 2(Fe.Chelate)^{+3} \quad (8)$$

By combining equations (6) through (8), the resulting equation is:

$$\tfrac{1}{2}O_2(gas) + H_2O + 2(Fe.Chelate)^{+2} \rightleftharpoons 2(OH)^- + 2(Fe.Chelate)^{+3} \quad (9)$$

It will be evident from the foregoing equations that theoretically two moles of ferric iron must be supplied to the reaction zone in which the hydrogen sulfide gas is oxidized to form elemental sulfur for each mole of hydrogen sulfide gas treated, and in actual practice considerably more than the theoretical amount of iron must be used. In a continuous process of absorbing or removing hydrogen sulfide by contacting with a catalytic ferric iron solution a large volume of catalytic solution must be circulated continuously between an absorber zone and an oxidizer zone where the reduced ferrous iron is oxidized to the ferric iron state. And, in order to avoid using high concentrations of iron in the catalytic reagent, the rate of circulation should be high.

The catalytic oxidation-reduction reactions for continuously removing hydrogen sulfide or the like from a fluid stream have heretofore been carried out concurrently in the same reaction vessel by means of a process which can be referred to as aerobic operation or by means of a process in which the oxidation and reduction steps are carried out in separate reaction vessels in what can be referred to as anaerobic operation (see U.S. Pat. No. 3,897,219). While an anaerobic operation may have certain advantages over an aerobic operation for treating some gas streams which must be recovered after $H_2S$ removal, there is the extra expense involved in providing additional equipment and the continuous pumping of large volumes of liquid from one vessel to the other increases operating costs.

It is therefore an object of the present invention to provide an improved method and means for continuously carrying out two distinct chemical reactions between a liquid and two different gases within a single vessel.

It is a further object of the present invention to provide an improved method and means for carrying out an oxidation-reduction reaction sequentially in a solution within a single vessel.

It is a further object of the present invention to provide an improved method and means for continuously removing hydrogen sulfide from a fluid stream in which hydrogen sulfide gas is contacted with a catalytic oxidation-reduction reaction solution.

Another object of the present invention is to provide an improved chemical reaction vessel in which hydrogen sulfide gas is continuously removed from a fluid stream.

Other objects of the present invention will be apparent to those skilled in the art from the following detailed description and claims to follow when read in conjunction with the accompanying drawing wherein;

Figure 1:
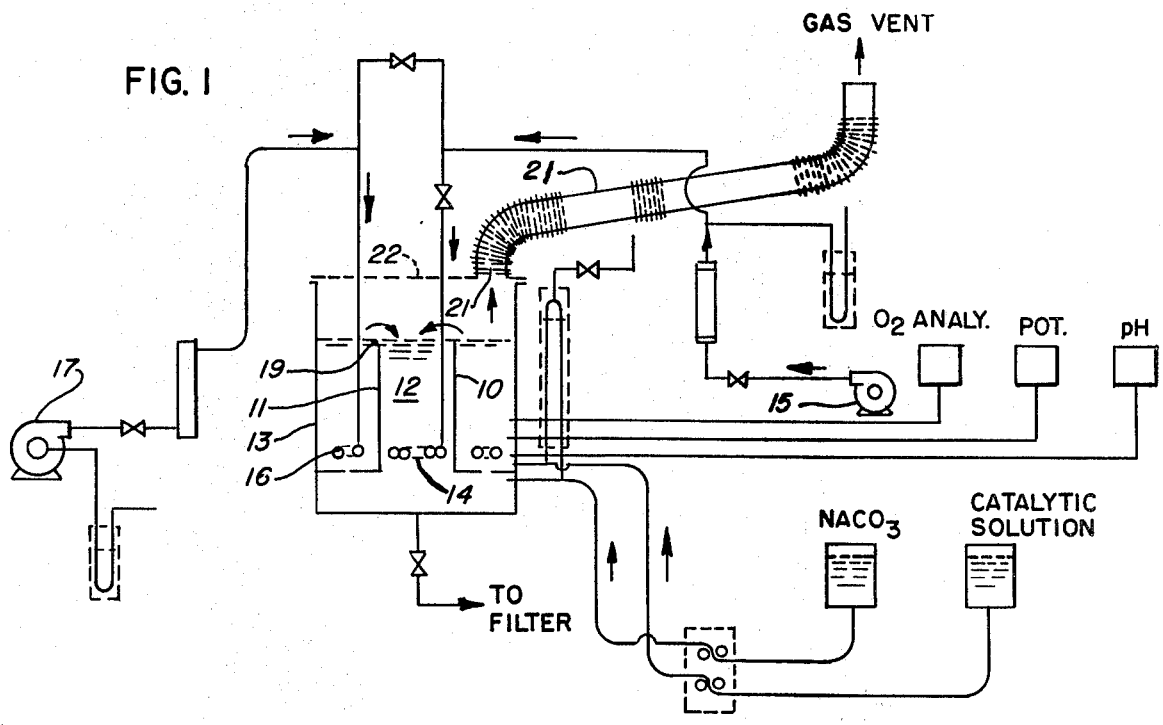
FIG. 1 is a schematic diagram of apparatus of the present invention which is used in the applicant's process for continuously removing hydrogen sulfide gas from a fluid stream by a catalytic oxidation-reaction process.

In achieving the foregoing objects and as schematically illustrated in FIG. 1 of the drawing a vertically disposed reaction vessel 10 is provided for carrying out a catalytic oxidation-reduction process for removing hydrogen sulfide from a gas stream in which (1) hydrogen sulfide is absorbed and oxidized to form elemental sulfur by reacting with a liquid reagent containing ferric iron during which reaction the ferric iron is reduced to ferrous iron and (2) the ferrous iron in the catalytic solution is regenerated to ferric iron by reacting with oxygen. The reaction vessel 10 has a generally cylindrical form and is provided with an open-ended cylindrical divider or separator 11 mounted coaxially within the vessel 10 with the upper and lower ends of the separator 11 spaced from the upper and lower end walls of the vessel 10 and defining a cylindrical central reaction zone or chamber 12 and a surrounding annular reaction zone or chamber 13. The inlet gas stream containing the hydrogen sulfide gas in finely divided form is introduced into cylindrical central reaction zone 12 through sparger rings 14 disposed within the reaction vessel 10 adjacent the lower end of open-ended cylindrical separator 11 with a blower 15 associated therewith for regulating the feed rate to the reaction zone. The outer annular reaction zone 13 is also provided adjacent the lower end thereof with sparger rings 16 which are connected with a blower 17 adapted to supply air in a finely divided form to the annular reaction zone 13. Both reaction zones are kept filled with the liquid reagent at all times without, however, completely filling the vessel 10. The sparger rings 16 preferably are adapted to supply air to the annular reaction zone 13 in sufficient volume to lower the density of the liquid reagent therein and create a positive differential head between the reaction zone 13 and the central reaction zone 12 in addition to providing sufficient oxygen to the reaction zone 13 for oxidizing the ferrous iron of the catalytic solution to ferric iron.

In order to avoid a reduction in the rate of flow of hydrogen sulfide containing process gas into the reaction zone 12 due to clogging of the small openings in the sparger rings 14 by ferrous sulfide which may be formed as a by product during the absorption of hydrogen sulfide gas, the sparger rings 14 are preferably made sufficiently flexible, as by forming of plastic tubing, so as to permit expansion of the gas discharge openings therein by the application of a mechanical compressive force or by increasing the gas pressure therein so as to effectively dislodge accumulation of the ferrous sulfide. Provision is also preferably made for adjusting the position of sparger rings 14 and 16 axially within the respective reaction zones in order to change the amount of aeration in the zones and thereby change the rate of circulation of the liquid reagent catalytic solution between the respective zones, as we describe hereinafter.

In operating, after adding liquid reagent comprising a catalytic ferric iron solution to the vessel 10 in an amount sufficient to cover the upper end 19 of the separator 11 and establishing the flow of hydrogen sulfide containing gas in the central reaction zone 12, the rate of flow of the oxygen containing gas, such as air, into the annular reaction zone 13 is adjusted so that the density of the liquid reagent in the annular reaction zone 13 is less than the density of the liquid reagent in the central reaction zone 12. With the density of the liquid reagent in the outer annular reaction zone 13 less than the liquid reagent in the central reaction zone 12, the liquid level in the annular reaction zone 13 rises above the liquid level in the central reaction zone 12 and the liquid reagent falls inwardly over the upper end 19 of the separator 11 into the cylindrical central reaction zone 12. And, since there is open passage of liquid from the bottom of the central reaction zone 12 to the bottom of the annular reaction zone 13, the liquid reagent flows upwardly in the annular reaction zone 13 and downwardly in the central reaction zone 12 while the reaction gases are flowing upwardly through each of the reaction zones, thus providing an auto-circulation of the catalytic solution within the reaction vessel 10. The gases from the reaction zones 12 and 13 are vented to the atmosphere through passage 21 in the cover 22. As liquid reagent is withdrawn from the vessel 10 by entrainment with reaction product material or lost by evaporation, fresh liquid reagent or recycled reagent is added to maintain the reaction zones 12, 13 filled.

In the event the composition of the process gas feed stream being treated or the solution requires increasing the rate of process gas flow into the central reaction zone 12 where $H_2S$ gas is absorbed above the rate at which air is introduced into the reaction zone 13, the direction of the flow of the catalytic solution in the vessel 10 will be reversed so that liquid flows upwardly through the central reaction zone 12 and downwardly in the annular reaction zone 13 in reaction vessel 10.

Figure 2:
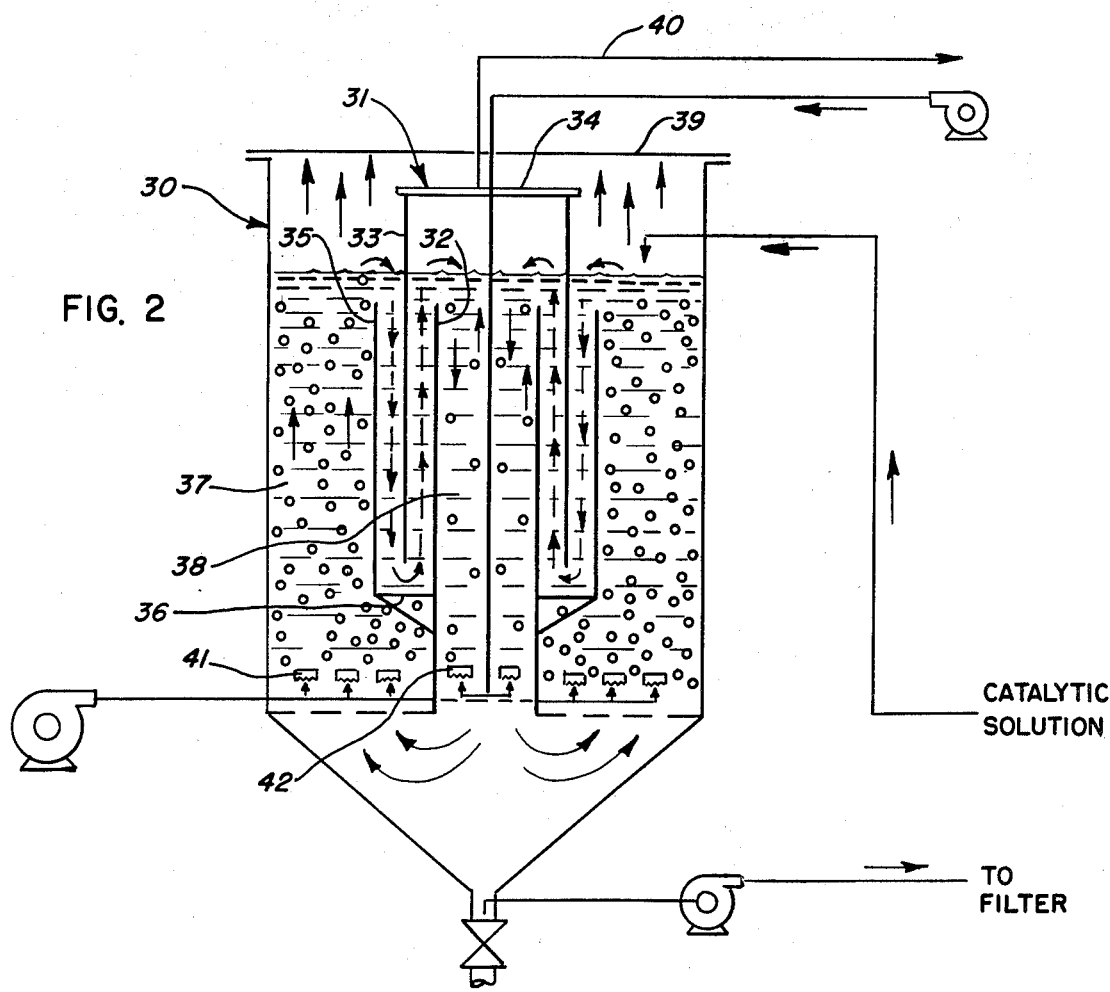
FIG. 2 is a modified form of an apparatus which can be used for carrying out the process illustrated in FIG. 1.

In order to avoid discharging incompletely treated process gas containing hydrogen sulfide into the atmosphere due to a malfunction of the apparatus or process, or when further use of the process gas is an object of the treatment process the upper end of the central reaction zone 12 can be provided with a gas collection hood, as shown in FIG. 2 of the drawing; wherein the hood 31 is spaced above the upper end of the cylindrical separator 32 of the reaction vessel 30 with a depending skirt section 33 extending axially downwardly from the end wall 34 thereof below the surface of the liquid reagent contained within the annular reaction zone 37. The cylindrical skirt section 33 is disposed in spaced surrounding relationship with the lateral cylindrical wall of the separator 32. A cylindrical spacer section 35 is mounted in spaced relationship with the depending skirt 33 and the lower end thereof extends below the lower end of the depending skirt 33. The upper edge of the spacer 35 is disposed slightly below the level of liquid in the reaction zone 37. A transverse wall section 36 extending from the lower end of the spacer section 35 to the separator 32 forming an annular liquid flow passage downwardly between the spacer section 35 and the skirt section 33, around the lower end of the depending skirt section 33 and upwardly between the skirt section 33 and separator 32 permitting liquid reagent to flow from the annular reaction zone 37 into the central reaction zone 38 without permitting a significant volume of gas to flow from the annular reaction zone 37 into the central reaction zone 38 and keeping the gas which passes upwardly through the central reaction zone 38 from entering the annular reaction zone 37 and being discharged into the atmosphere. The gas from the central reaction zone 38 is collected in the hood 31 and is conveyed therefrom through the cover 39 by means of the conduit 40. When the flow of gas into the annular reaction zone 37 through the sparger 41 is greater than the flow of gas through sparger 42 and the density of the liquid reagent in the reaction zone 37 is maintained lower than the density of the liquid reagent in the central reaction zone 38, the flow of liquid reagent will be downwardly in the reaction zone 38 and upwardly in the annular reaction zone 37, as described in connection with the apparatus of FIG. 1.

Figure 3:
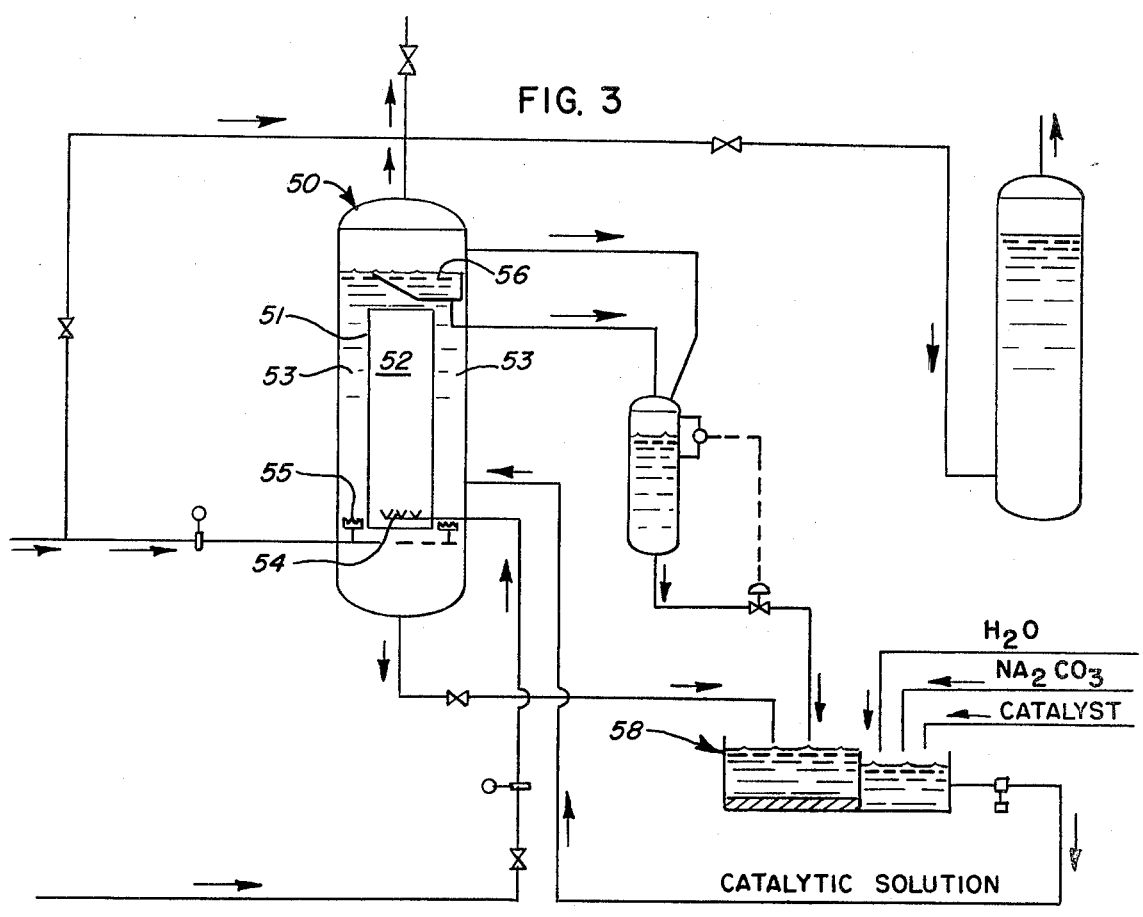
FIG. 3 is a schematic diagram of modified apparatus which can be used for carrying out the process of the present invention.

In a modified form of apparatus for removing hydrogen sulfide gas from a process gas stream by a catalytic oxidation-reduction process shown in FIG. 3 of the drawing, the cylindrical reaction vessel 50 having the approximate dimension of 6 feet in diameter and 30 feet in length is provided with an open ended cylindrical separator 51 disposed co-axially therein and spaced from both ends of the vessel 50. The cylindrical separator 51 has the approximate dimensions of 1.5 feet in diameter and 14 feet in length. The cylindrical separator 51 divides the vessel 50 into a central reaction zone 52 and an annular reaction zone 53 which surrounds the central reaction zone 52. Sparger rings 54 are mounted adjacent the lower end of the separator 51 and are adapted to supply oxygen containing gas (air) to the lower end of the central reaction zone 52. The annular reaction zone 53 also is provided with flexible sparger rings 55 adjacent the lower end of the separator 51 and are adapted to provide hydrogen sulfide containing gas to the annular reaction zone 53. A liquid level control means 56 is provided spaced downwardly from the upper end of the reaction vessel 50 but above the upper end of the separator 51 for maintaining the liquid reaction reagent at a predetermined level within the vessel 50. Means are provided at the lower end of the separator 51 for collecting and removing reaction product from the lower end of the reaction vessel 50 and a solid-liquid separator and liquid recycling means 58 for returning liquid reagent to the reaction vessel 50 are also provided.

In the apparatus of FIG. 3 the composition of the process gas being treated is such that the process gas is supplied to the annular reaction zone 53 in larger volume than the volume of oxygen containing gas supplied to the central reaction zone 52. Thus, the flow of liquid reagent is upwardly in the annular reaction zone 53 and downwardly in the central reaction zone 52. Typical operating conditions and material balance for an oxygen reduction process using the above described apparatus is shown in the following tables:

TABLE I

Design Basis

| Gas Properties | | |
|---|---|---|
| Flow H$_2$S, SCFM | 694.4/6.7 Atm. | (1.0 MM SCFD) |
| Flow Air, SCFM | 22.7/6.7 Atm. | |
| H$_2$S in. ppm | 1294 | (80 grains/100 SCF) |
| H$_2$S out, ppm | 4 | ($\frac{1}{4}$grains/100 SCF) |
| Efficiency, % | 99.7 | |
| Product Distribution | | |
| Theoretical sulfur, lb/hr | 4.8 (0.05 LT/Day) | |
| Actual sulfur, lb/hr | 4.5 (0.05 LT/Day) | |
| Na$_2$S$_2$O$_3$, lb/hr | 0.5 | |
| Na$_2$SO$_4$, lb/hr | 0.1 | |
| Na$_2$CO$_3$, req'd., lb/hr | 0.4 | |
| Operating Parameters | | |
| Iron/H$_2$S Mol Ratio | 4.5 | |
| Air/Theoretical Air | 10.0 | |
| Iron/Solution, wt. ppm | 500 | |
| Solution Alkalinity, pH | 7-8.5 | |
| Solution Volume in Absorber, pH, ft$^3$ | 309.4 | |
| Solution Volume in Oxidizer, ft$^3$ | 19.4 ft$^3$ | |
| Displacement | | |
| H$_2$S Absorber, ft$^3$ | 50.0 | |
| Oxidizer, ft$^3$ | 1.2 | |

TABLE II

Material Balance

Mol/Hr.
Gas Flows

| | Gas In | Gas Out | ABS | Air In | Air Out | Oxid. | Total Gas Out |
|---|---|---|---|---|---|---|---|
| Inerts | 108.7[1] | 108.7 | — | — | — | — | 108.70 |
| N$_2$+A | — | — | — | 2.82 | 2.82 | — | 2.82 |
| O$_2$ | — | — | — | 0.74 | 0.67 | −0.07 | 0.67 |
| H$_2$S | 0.15 | — | −0.15 | — | — | — | — |
| H$_2$O | 1.15 | 1.54 | +0.39 | 0.04 | 0.05 | +0.01 | 1.59 |
| CO$_2$ | — | — | — | — | — | — | — |
| | 110 | 110.24 | 0.24 | 3.60 | 3.54 | −0.06 | 113.78 |
| Lb/Hr | 1982.1 | 1984.3 | 2.2 | 103.4 | 101.3 | −2.1 | 2085.6 |
| MW | 18.01 | 18.0 | — | 28.7 | 28.6 | — | 18.33 |
| SCFM | 694.8 | 696.3 | — | 22.7 | 22.4 | — | 718.7 |
| Temp., °F. | 100 | 112 | — | 100 | 112 | — | 112 |
| Press., PSIG | 85 | 80 | — | 85 | 80 | — | 80 |
| ACFM | 110.3 | 118.9 | — | 3.61 | 3.82 | — | 122.7 |

[1]Assumed 18 MW.

| | Solution to Absorber | Absorber | Solution to Oxidizer | Solution to Settler | Settled Sulfur | Water Added | Solution to Absorber | Solution from Oxidizer | Total to Absorber |
|---|---|---|---|---|---|---|---|---|---|
| Water | 3,916.0 | −0.39 | 3,915.61 | 52.2 | 0.56 | 0.95 | 52.59 | 863.41 | 3,916.0 |
| S° | 12.2 | +0.14 | 12.34 | 0.16 | 0.14 | — | 0.02 | 12.18 | 12.2 |
| Na$_2$S$_2$O$_3$ | 49.8 | +0.01 | 49.81 | 0.66 | 0.01 | — | 0.65 | 49.65 | 49.8 |
| | 3,978.0 | −0.24 | 3,977.76 | 53.02 | 0.71 | 0.95 | 53.26 | 3,924.74 | 3,978.0 |

TABLE II-continued

Material Balance

| | | | | Mol/Hr. Gas Flows | | | | | |
|---|---|---|---|---|---|---|---|---|---|
| Lb/Hr. | 78,750.0 | −2.2 | 78,747.8 | 1,050 | 14.5 | 17.1 | 1,052.60 | 77,697.8 | 78,750 |
| MW | 19.8 | — | 19.8 | 19.8 | 20.6 | 18 | 19.76 | 19.8 | 19.8 |
| GPM | 150 | — | 150 | 2.0 | 0.02 | 0.03 | 2.01 | 148 | 150 |
| s.g. | 1.05 | — | 1.05 | 1.05 | 1.23 | 1.00 | 1.05 | 1.05 | 1.05 |
| Lb/Gal. | 8.75 | — | 8.75 | 8.75 | 10.24 | 8.33 | 8.75 | 8.75 | 8.75 |

Figure 4:
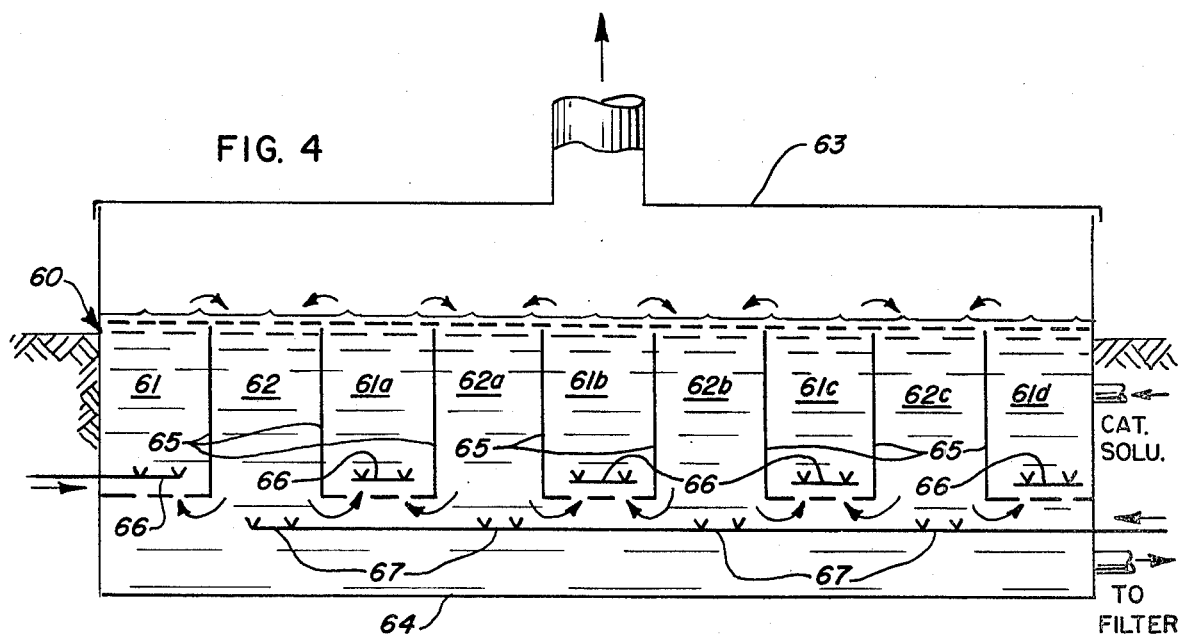
FIG. 4 is a schematic diagram of a further modified form of apparatus which can be used for carrying out the process of the present invention.

While a cylindrical reaction vessel with concentric cylindrical and annular reaction zones are preferred for small units because of the simplicity in mechanical design and relatively low construction costs, large units employing such a design are likely to involve serious liquid flow distribution problems. FIG. 4 of the drawing illustrates a large capacity unit suitable for practicing the process of the present invention in which a rectangular reaction vessel 60 is built largely below grade level and which is formed of a series of rectangular absorption reaction zones 61, 61a, 61b, 61c and a series of oxidizing reaction zones 62, 62a, 62b, 62c, 62d in open flow communication at their upper and lower ends. The absorption and oxidation reaction zones are disposed in side-by-side relationship and are formed by spaced vertically mounted rectangular partition members 65 disposed at spaced points within the reaction vessel 60 with the upper and lower ends of the partition members 65 spaced from the upper and lower end walls 63, 64, respectively, of the vessel 60. Spargers 66 adapted to introduce a selected gas in a finely divided form into the absorption reaction zones 61, 61a, 61b, 61c are mounted adjacent the lower ends of said zones, and spargers 67 adapted to introduce another selected gas in a finely divided form into the oxidizing reaction zones 62, 62a, 62b, 62c, 62d are disposed adjacent the lower ends of said zones. Each of said spargers 66, 67 has associated therewith means for controlling the rate of addition of each said gas to the respective reaction zones.

When the reaction vessel 60 is filled with a catalytic oxidation-reduction solution for absorbing hydrogen sulfide gas as shown in FIG. 4 and when the rate of flow of hydrogen sulfide containing gas to the reaction zones 61, 61a, 61b, 61c is controlled to establish a positive differential head of about 60 pounds per square foot relative to the flow of oxygen containing gas in the oxidizer reaction zones, an upwardly flow of the catalytic reaction solution is established in each of the absorption zones 61, 61a, 61b, 61c due to the lower density of the liquid therein. Simultaneously, the catalytic reaction solution flows downwardly in the contiguous oxidation reaction zones 62, 62a, 62b, 62c, 62d so that there is a continuous circulation of the catalytic reaction solution within the reaction vessel in the several contiguous absorption and oxidation reaction zones along the length of the reaction vessel 60.

The process and apparatus of the present invention have been described in connection with a continuous process for removing hydrogen sulfide gas from a process gas stream, but it should be understood that the invention can be applied to effect other chemical reactions with a liquid reagent and gases where it is necessary to regenerate the liquid reagent by treating with a gaseous medium after the liquid reagent has been reacted with another gaseous medium and recycling the regenerated liquid reagent to the original reaction zone, such as when continuous removing of a mercaptan from a process gas stream by an oxidation-reduction process.

In each of the applications of the process the absorption efficiency is high when using a low concentration (500 ppm) of the catalytic metal, such as iron or vanadium.

I claim:

1. In a continuous process of chemically reacting a liquid reagent sequentially with two different gases in a reaction vessel having therein a first vertically extending reaction zone and a second vertically extending reaction zone laterally spaced within the reaction vessel with said zones being in open liquid flow communication at their upper and lower ends and filled with said liquid reagent, the improvement which comprises:
   (a) introducing in a finely divided form a first gas which is chemically reactive with said liquid reagent into said first reaction zones at a point adjacent the lower end thereof,
   (b) introducing a second gas in a finely divided form into the second reaction zone at a point adjacent the lower end thereof with said second gas being chemically reactive therein with said liquid reagent after said light reagent has chemically reacted with said first gas in said first reaction zone, and
   (c) controlling the rate at which said gases are introduced into the said reaction zones to maintain the density of the liquid reagent in one of said reaction zones different from the density of the liquid reagent in the other said reaction zone to effect continuous circulation of liquid reagent from one said reaction zone to a contiguous other said reaction zone, and said chemical reaction between the liquid reagent and one of said gases takes place while said liquid reagent flows concurrently with one of said gases in one of said reaction zones and the second chemical reaction takes place between said liquid reagent and the other of said gases in the other said reaction zone while said liquid reagent flows countercurrent to the flow of the other of said gases within said reaction vessel.

2. In a process of continuously chemically reacting sequentially a reactive liquid reagent with two different gases in separate vertically disposed laterally spaced reaction zones in open flow communications at the upper and lower ends to enable continuous flow of said liquid reagent from one reaction zone to the other reaction zone within a single reaction vessel, the improvement which comprises;
   (a) introducing a first gas in a finely divided form into said reactive liquid reagent in a first reaction zone at a point adjacent the lower end of said first reaction zone to provide upwardly flow of said first gas therein and said liquid agent being in a form which is chemically reactive with said first gas,
   (b) introducing a second gas in a finely divided form into the second reaction zone containing said liquid reagent from said first reaction zone at a point adjacent the lower end of said second reaction zone to provide upwardly flow of said second gas therein with said second gas being chemically reactive with said liquid reagent from said first reaction zone to transform said liquid reagent to the form thereof which is chemically reactive with said first gas, and (c) effecting continuous circulation of said liquid reagent from one said reaction zone to the other said reaction zone entirely by controlling the rates at which said first and second gases are introduced into said first and second reaction zones to maintain the density of the liquid reagent in one of said reaction zone below the density of the liquid reagent in the other said reaction zone to produce upwardly flow of liquid reagent through the reaction zone having the lower density and downwardly flow of liquid reagent through a contiguous reaction zone, and said liquid reagent reacting chemically with one of said upwardly flowing gases while said liquid reagent flows upwardly in one reaction zone and said liquid reagent reacting chemically with the other said upwardly flowing gases while the reagent flows downwardly in the other said reaction zone.

3. In a continuous oxidation-reduction process for removing hydrogen sulfide gas from a gas stream by continuously effecting contact between hydrogen sulfide and a catalytic oxidation-reduction reaction solution which is reduced when contacted by hydrogen sulfide and wherein said gas stream is passed through a first vertically disposed reaction zone in which the reaction solution reacts with hydrogen sulfide gas to form elemental sulfur and the reaction solution is reduced and thereafter circulating the reduced reaction solution to a second vertically disposed laterally spaced reaction zone having the upper and lower ends in open flow communication with the first reaction zone and wherein said reaction solution is oxidized by an oxygen containing gas, the improvement comprising;

(a) introducing a hydrogen sulfide containing gas in a finely divided form into said first reaction zone filled with the reducible catalytic oxidation-reduction reaction solution at a point adjacent the lower end thereof to provide upwardly flow of said hydrogen sulfide containing gas therein while effecting reduction of said catalytic solution and oxidation of said hydrogen sulfide to elemental sulfur, (b) introducing said oxygen containing gas in a finely divided form into said second reaction zone filled with the reduced catalytic oxidation-reduction reaction solution from said first reaction zone at a point adjacent the lower end thereof to provide upwardly flow of oxygen containing gas therein and effecting oxidation of the oxidation-reduction reaction solution, (c) controlling the rate at which each said gas is introduced into the respective reaction zones to effect lowering the density of said reaction solution in one of said reaction zones below the density of the reaction solution in the other reaction zone to draw liquid catalytic solution into the reaction zone having the lower density from the reaction zone having the higher density and thereby effecting continuous circulation of said reaction solution, and said catalytic oxidation-reduction solution being reduced by upwardly flowing hydrogen sulfide containing gas stream while said reaction solution flows in one vertical direction within said first reaction zones and said reduced reaction solution being oxidized in said second reaction zone to its original reactive state by said upwardly flowing oxygen containing gas while said reduced reaction solution is flowing in a vertical direction opposite to the flow of the reaction solution within the said first reaction zone before said solution returns to said first reaction zone.

4. In an oxidation-reduction process for continuously removing hydrogen sulfide gas from a gas stream by passing said gas stream through a vertically disposed reaction vessel having a first reaction zone in which an aqueous liquid catalytic solution comprising a reducible ferric iron reagent in a reactive state is reduced by reacting with hydrogen sulfide gas and forms elemental sulfur and continuously circulating said catalytic reaction solution from said first reaction zone into a contiguous laterally spaced second reaction zone in open liquid flow communication therewith at both their upper and lower ends and wherein said catalytic solution is oxidized by an oxygen containing gas and returning said catalytic solution in its original reactive state to said first reaction zone, the improvement comprising;

(a) introducing a hydrogen sulfide containing gas in a finely divided form into the vertically extending first reaction zone filled with said catalytic solution at a point adjacent the lower end thereof to provide upwardly flow therethrough of hydrogen sulfide containing gas and wherein said solution is reduced and elemental sulfur formed.

(b) introducing an oxygen containing gas in a finely divided form into the vertically extending second reaction zone at a point therein adjacent the lower end thereof to provide upwardly flow of oxygen containing gas and effecting oxidation of the reduced catalytic solution to its original reactive form therein, (c) controlling the rate at which said hydrogen sulfide containing gas is introduced into the said first reaction zones to effect lowering the density of the liquid catalytic solution in said first reaction zones below the density of the liquid catalytic solution in the second reaction zone to draw the said solution into the reaction zone having the lower density from the reaction zone having the higher density and effecting continuous circulation of said solution within said reaction vessel, and said solution being reduced by the hydrogen sulfide containing gas stream while flowing in an upwardly vertical direction within said first reaction zone and said solution thereafter being oxidized in said second reaction zone to the original reactive state thereof by said oxygen containing gas while the said solution flows in a downwardly vertical direction within said second reaction zone.

5. An oxidation-reduction process as in claim 3, wherein said first reaction zone is coaxial with said second reaction zone with said first reaction zone being an annular zone disposed around said second reaction zone.

6. A process as in claim 3, wherein said catalytic oxidation-reduction reaction solution in said first reaction zone is reduced by the hydrogen sulfide of said gas stream flowing upwardly while said reaction solution flows concurrently with said gas stream, and said reduced reaction solution is oxidized in said second reaction zone to its original reactive state by said upwardly flowing oxygen containing gas while said reaction solution is flowing through said second reaction zone countercurrently to said oxygen containing gas stream therein.

7. A process as in claim 3, wherein said catalytic oxidation-reduction reaction solution is reduced in said first reaction zone by the hydrogen sulfide in said gas stream flowing upwardly therein while said reaction solution flows countercurrently to said gas stream, and said reduced reaction solution is oxidized in said second reaction zone to its original reducible reactive state by said upwardly flowing oxygen containing gas while said reaction solution is flowing through said second reaction zone concurrently with said oxygen containing gas stream.

* * * * *

UNITED STATES PATENT AND TRADEMARK OFFICE
CERTIFICATE OF CORRECTION

PATENT NO. : 4,238,462
DATED : December 9, 1980
INVENTOR(S) : Leslie C. Hardison It is certified that error appears in the above–identified patent and that said Letters Patent are hereby corrected as shown below:

Column 8, line 33, "light" should read --liquid--.

Signed and Sealed this

Twenty-first Day of April 1981

[SEAL]

Attest:

RENE D. TEGTMEYER

Attesting Officer

Acting Commissioner of Patents and Trademarks